United States Patent
Cotirlea et al.

(10) Patent No.: US 11,327,798 B1
(45) Date of Patent: May 10, 2022

(54) ACCELERATING AN APPLICATION CODE PORTION BASED ON A RECEIVED CONFIGURATION

(71) Applicant: Meta Platforms, Inc., Menlo Park, CA (US)

(72) Inventors: Anamaria Cotirlea, London (GB); Chen-Hui Huang, London (GB)

(73) Assignee: Meta Platforms, Inc., Menlo Park, CA (US)

( * ) Notice: Subject to any disclaimer, the term of this patent is extended or adjusted under 35 U.S.C. 154(b) by 10 days.

(21) Appl. No.: 16/407,063

(22) Filed: May 8, 2019

(51) Int. Cl.
  *G06F 9/50* (2006.01)
  *G06F 9/54* (2006.01)
  *G06F 1/3212* (2019.01)
  *G06F 9/38* (2018.01)

(52) U.S. Cl.
  CPC .......... *G06F 9/5011* (2013.01); *G06F 1/3212* (2013.01); *G06F 9/3877* (2013.01); *G06F 9/541* (2013.01)

(58) Field of Classification Search
  CPC .... G06F 9/5011; G06F 1/3212; G06F 9/3877; G06F 9/541; G06F 11/3419; G06F 11/3466; G06F 17/18; G06F 9/5044
  See application file for complete search history.

(56) References Cited

U.S. PATENT DOCUMENTS

| | | | | |
|---|---|---|---|---|
| 5,774,704 A * | 6/1998 | Williams | ................ | G06F 1/08 713/501 |
| 7,634,678 B2 * | 12/2009 | Winbom | ................ | G06F 1/324 713/501 |
| 2002/0073406 A1 * | 6/2002 | Gove | ................ | G06F 11/3466 717/154 |
| 2004/0073826 A1 * | 4/2004 | Yamashita | ................ | G06F 1/08 713/323 |
| 2007/0288769 A1 * | 12/2007 | Chang | ................ | G06F 1/324 713/300 |
| 2011/0153984 A1 * | 6/2011 | Wolfe | ................ | G06F 9/5027 712/42 |
| 2012/0154412 A1 * | 6/2012 | Harney | ................ | G06F 9/5011 345/522 |
| 2014/0019929 A1 * | 1/2014 | Raviv | ................ | G06F 30/331 716/112 |
| 2014/0095909 A1 * | 4/2014 | Turullols | ................ | G06F 1/324 713/322 |
| 2014/0184615 A1 * | 7/2014 | Bergquist | ................ | G09G 5/02 345/503 |
| 2014/0281424 A1 * | 9/2014 | Bobba | ................ | G06F 9/3005 712/225 |
| 2014/0297405 A1 * | 10/2014 | Fine | ................ | G06F 11/3428 705/14.53 |
| 2016/0364271 A1 * | 12/2016 | Burger | ................ | G06F 9/505 |
| 2018/0081817 A1 * | 3/2018 | Turner | ................ | G06F 12/0815 |
| 2019/0050263 A1 * | 2/2019 | Patel | ................ | G06F 9/5044 |
| 2019/0199539 A1 * | 6/2019 | Deng | ................ | H04L 69/162 |

(Continued)

*Primary Examiner* — Jorge A Chu Joy-Davila
(74) *Attorney, Agent, or Firm* — Van Pelt, Yi & James LLP

(57) ABSTRACT

An application level request associated with a portion of an application code requested to be executed with an adjusted hardware acceleration (wherein the portion of the application code is identified using a mechanism compatible with a plurality of different hardware processors) is received. It is determined whether to allow the adjusted hardware acceleration based at least in part on a configuration received via a network.

20 Claims, 6 Drawing Sheets

(56) References Cited

U.S. PATENT DOCUMENTS

2019/0332517 A1* 10/2019 Schardt ................. G06F 11/364
2020/0089480 A1*  3/2020 Chen .................... G06F 15/163
2020/0097061 A1*  3/2020 Ostby ................... G06F 1/3212

* cited by examiner

US 11,327,798 B1

ACCELERATING AN APPLICATION CODE PORTION BASED ON A RECEIVED CONFIGURATION

BACKGROUND OF THE INVENTION

With respect to computing, hardware includes physical, tangible parts or components, and software includes a collection of data or instructions. Software usually directs hardware to execute instructions or commands. A processor is an electronic circuit that is typically associated with executing software instructions. Examples of processors include central processing units (CPUs) and graphics processing units (GPUs). Processors exist in many computing environments (e.g., mobile computing, non-mobile computing, computing involving networks, etc.). A chipset is a set of electronic components that manages computing data flow (e.g., flow of software instructions in memory to and from a processor). For this reason, chipsets play a significant role in determining computing performance.

BRIEF DESCRIPTION OF THE DRAWINGS

Various embodiments of the invention are disclosed in the following detailed description and the accompanying drawings.

DETAILED DESCRIPTION

Figure 1:
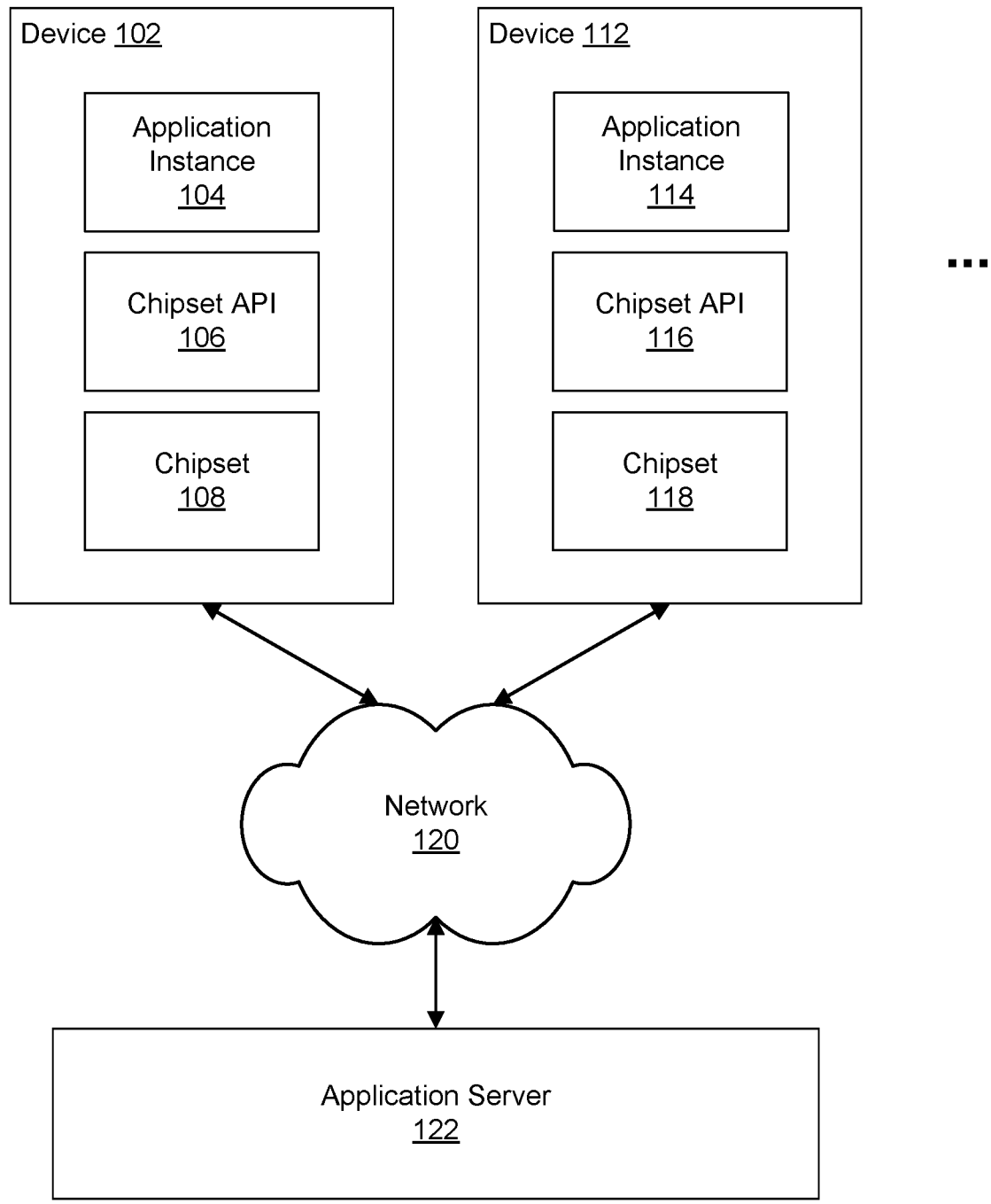
FIG. 1 is a block diagram illustrating an embodiment of an environment supporting acceleration of application code portions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Computing performance (e.g., how quickly an application runs on a computing platform, such as a mobile device) can depend on a variety of factors. Software design can affect computing performance. Software changes (e.g., optimizations, redesigns, etc.) to application code can enhance computing performance. Hardware changes (e.g., associated with memory, processors, etc.) can also affect computing performance. Thus, it would be beneficial to develop hardware approaches to allow applications (e.g., mobile applications) to run more efficiently.

Accelerating a portion of application code is disclosed. The disclosed method comprises receiving an application level request associated with a portion of an application code requested to be executed with an adjusted hardware acceleration (wherein the portion of the application code is identified using a mechanism compatible with a plurality of different hardware processors) and determining whether to allow the adjusted hardware acceleration based at least in part on a configuration received via a network. A practical and technological benefit of the invention disclosed herein is allowing for acceleration of application code running on a variety of hardware processors. Furthermore, this acceleration can be tailored and modified as needed because it is configurable.

In various embodiments, a portion of application code of an application is designated to be accelerated. For example, a programmer, developer, creator, etc. of the application may selectively designate the portion to be accelerated, wherein it is believed that acceleration of that portion could enhance performance and/or user experience in exchange for a relatively low expenditure of hardware resources. Examples of application code portions that may benefit from acceleration, leading to improved computational experiences include application code portions associated with newsfeed scrolling, message scrolling, message list scrolling, user interface transitions, and other scenarios.

In some embodiments, software code markers surround, label and/or designate a portion of application code to be accelerated by annotating/marking/labeling the application code. As is readily apparent to a person skilled in the art, this may be done in various programming languages. In various embodiments, when a start marker is reached during execution of the application code, a chipset application programming interface (API) is used by the application running the application code to request hardware acceleration (e.g., increased CPU or GPU frequency) until an end marker is reached. For example, a mobile application that a user can use to read newsfeeds may be requested to execute application code associated with scrolling through a newsfeed, wherein the application code associated with scrolling through newsfeeds has software code markers that designate hardware acceleration.

In various embodiments, the application determines whether to allow acceleration for a portion of application code (e.g., whether to allow increased CPU frequency to execute application code associated with scrolling through a newsfeed). In some embodiments, the application determines whether to allow the acceleration based at least in part on a configuration received via a network. For example, an application on a mobile device may connect to an application server via a network when the application launches and then download the configuration. Examples of information in the configuration (e.g., a configuration file) include blacklists of chipsets, device models, operating system (OS) versions, etc. for which hardware acceleration should not be performed, quotas specifying duration limits for acceleration (e.g., maximum duration of acceleration allowed per minute, hour, day, and so forth), and other safeguards as further described herein.

In various embodiments, when the application launches for the first time, it determines and stores information such as device model, device OS, device chipset(s), chipset API(s), etc. This information can be used in conjunction with the downloaded configuration to determine whether to allow acceleration. For example, if the application determines that the device on which the application runs is blacklisted, acceleration would not be allowed. Determining which APIs are available lets the application determine how to implement calls to perform hardware acceleration. In various embodiments, the application monitors durations of instances of allowed accelerations (e.g., in order to determine whether acceleration duration limits have been reached and thus further acceleration within a specified period of time should not be allowed).

In various embodiments, usage data associated with acceleration is collected and aggregated. Examples of this usage data include acceleration start time, acceleration end time, acceleration duration, code segment accelerated, CPU frequency during acceleration, acceleration timeout or interruption status (e.g., interrupted due to high CPU temperature, excessive battery drain, or other reasons), etc. Other information may be collected when an application is first launched after it is installed (e.g., device brand, device model, OS version and other settings), and this information may be correlated with the collected and aggregated usage data. The effects of acceleration may be analyzed in order to blacklist problematic devices or change acceleration parameters (e.g., CPU frequency). In various embodiments, server-side comparisons of various metrics are done in order to determine either manually (e.g., human data evaluation) or automatically (e.g., automated analysis of performance metrics) what parameters to alter and/or blacklists to modify. Blacklists may be automatically updated based on collected usage data detailing impact of acceleration on device performance, duration of acceleration per device, frequency of acceleration timeouts and/or interruptions, frequency of acceleration quotas being met, etc. For example, device models for which timeouts and/or interruptions occur at a rate above a specified threshold may be automatically blacklisted.

FIG. 1 is a block diagram illustrating an embodiment of an environment supporting acceleration of application code portions. In the example illustrated in FIG. 1, device 102 and device 112 communicate with application server 122 via network 120. Additional devices may also communicate with application server 122 via network 120. Examples of network 120 include one or more of the following: a direct or indirect physical communication connection, mobile communication network, Internet, intranet, Local Area Network, Wide Area Network, Storage Area Network, and any other form of connecting two or more systems, components, or storage devices together. In some embodiments, device 102 and device 112 are mobile devices (e.g., smartphones) that connect wirelessly (e.g., via a cellular network, Wi-Fi, etc.) to an application server associated with an application running on the mobile devices.

In the example shown, device 102 includes application instance 104, chipset API 106, and chipset 108. In the example shown, device 112 includes application instance 114, chipset API 116, and chipset 118. In various embodiments, chipset 108 and chipset 118 include chipset hardware (e.g., one or more processors, memory, etc.). Application instance 104 and application instance 114 are different instances of an application running on device 102 and device 112 respectively (e.g., a social media application that allows users to scroll through newsfeeds, messages, images, etc. or any other type of application). Device 102 and device 112 may be different device types (e.g., different brands, running different operating systems, one device being mobile while the other is not, etc.). Furthermore, device 102 and device 112 may use different chipsets and different chipset APIs (e.g., chipset 108 being different from chipset 118 and consequently chipset API 106 being different from chipset API 116).

In various embodiments, an application instance (e.g., application instance 104) is running and encounters a portion of application code of the application that is designated to be hardware accelerated (e.g., run at an increased CPU/GPU frequency). For example, the portion of application code may be boosted to run at X % (e.g., 75%) of a chipset's specified capability. In various embodiments, the application directs the chipset to boost performance via a chipset API. For example, in some embodiments, application instance 104 has application code that is configured to be able to interface with a specified list of chipset APIs (and thus request acceleration from a specified list of chipsets). In various embodiments, if the chipset API and chipset are supported, application instance 104 uses chipset API 106 to notify chipset 108 to make a hardware adjustment (e.g., increase CPU and/or GPU frequency).

In some embodiments, a device (e.g., device 102) receives configuration information for the application (e.g., application instance 104) from application server 122. The configuration information may be in the form of a configuration file. In some embodiments, the configuration information includes blacklisted hardware configurations (e.g., with respect to device models, operating systems, etc.) and other safeguard settings (e.g., hardware acceleration duration limits based on chipset type). In some embodiments, updated configuration information is received every time the application launches. Updated configuration information may also be received at other times (e.g., when the application goes idle). In some embodiments, application server 122 receives usage statistics (e.g., on durations of hardware acceleration) associated with various devices running the application. The devices running the application (e.g., device 102 and device 112) may report usage data periodically (e.g., daily as long as the application has access to network 120). In some embodiments, application server 122 is configured to be able to send a kill signal to individual devices (e.g., via network 120) that disallows acceleration for application instances. In some embodiments, individual application instances can be controlled (disallowing acceleration for those application instances) with flags in the application instances that directly gate whether acceleration is allowed or not allowed. This kill signal mechanism is a safeguard mechanism that in some circumstances can be more expeditious than controlling acceleration behavior through configuration updates.

In the example illustrated in FIG. 1, portions of the communication path between the components are shown.

Other communication paths may exist, and the example of FIG. 1 has been simplified to illustrate the example clearly. Although single instances of components have been shown to simplify the diagram, additional instances of any of the components shown in FIG. 1 may exist. For example, additional devices may connect to network 120. The number of components and the connections shown in FIG. 1 are merely illustrative. Components not shown in FIG. 1 may also exist.

Figure 2:
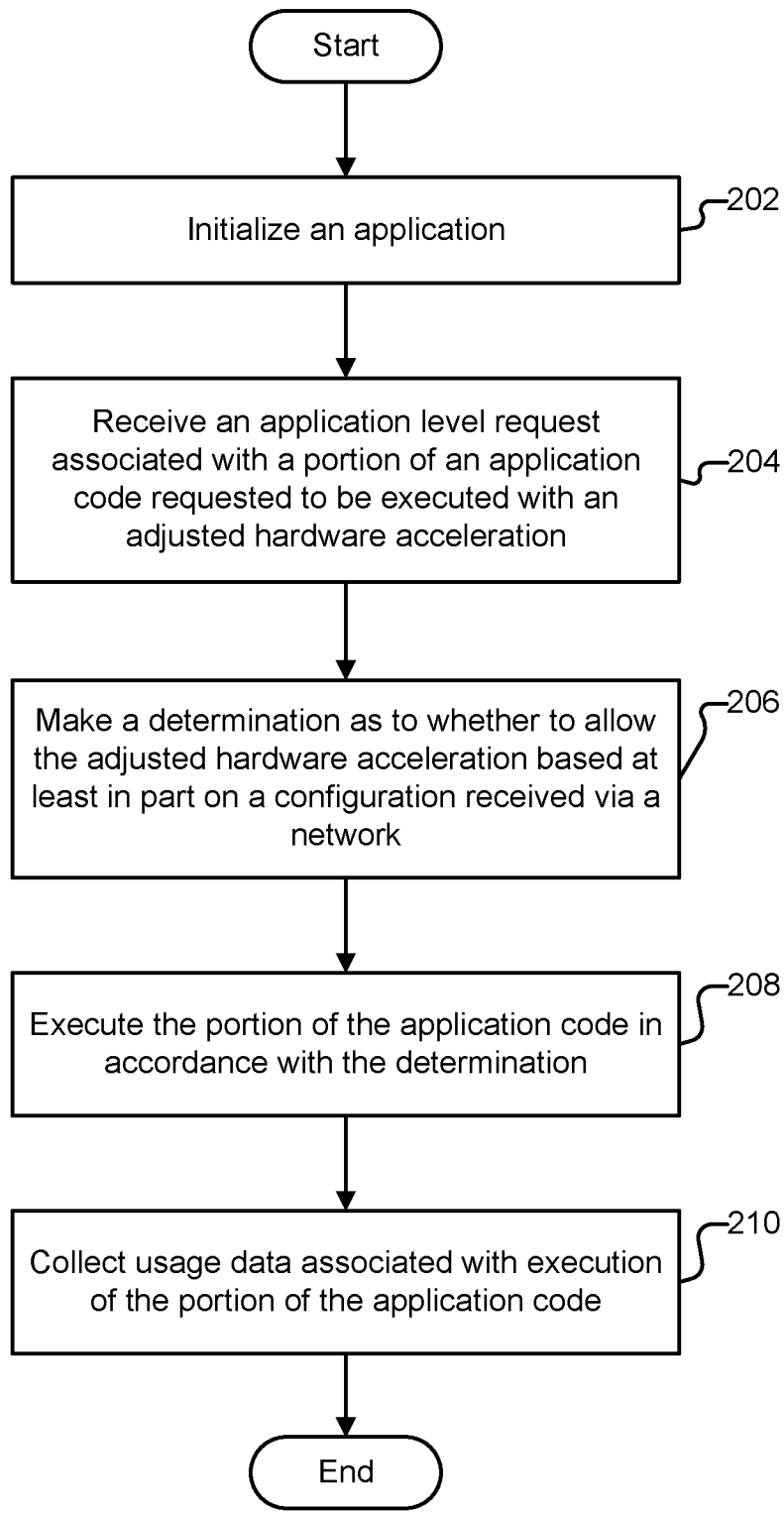
FIG. 2 is a flowchart illustrating an embodiment of a process for accelerating a portion of application code.

FIG. 2 is a flowchart illustrating an embodiment of a process for accelerating a portion of application code. In some embodiments, this process is performed by device 102 or device 112 of FIG. 1.

At 202, an application is initialized. In some embodiments, the application runs on a mobile device. It also possible for the application to run on a non-mobile device. The application may be a social media application that allows users to scroll through newsfeeds, messages, images, etc. or any other type of application. In various embodiments, initializing the application includes launching the application (e.g., starting up the application on a mobile or non-mobile device after a user taps, clicks, or otherwise interacts with an icon representing the application). In some embodiments, when the application is launched for the first time, the application gathers information regarding the device on which the application runs. Examples of information that the application may gather include device model, device brand, device OS version, device chipset (including processor type), device chipset API, etc. This information may be used to determine whether hardware acceleration of portions of application code should be allowed depending on specified conditions. For example, hardware acceleration may be disabled for certain hardware configurations (e.g., blacklisted for certain device models, device OS versions, etc.) as safeguards against potential negative performance consequences for devices running the application. In some embodiments, blacklists for certain hardware configurations and other safeguard configuration information is updated every time the application launches (e.g., by receiving an update via a network from an application server). Updates may also be received when the application is idle.

At 204, an application level request associated with a portion of an application code requested to be executed with an adjusted hardware acceleration is received. In some embodiments, a portion of an application code (e.g., of application instance 104 or 114 of FIG. 1) is requested to be executed with an adjusted hardware acceleration (e.g., with software code markers designating the portion of the application code). For example, the portion of the application code may be associated with newsfeed scrolling, message scrolling, message list scrolling, user interface transitions, or other situations that could benefit from using more hardware resources. In various embodiments, a programmer, application developer, etc. places software code markers around a code portion (e.g., associated with newsfeed scrolling, message scrolling, message list scrolling, user interface transitions, etc.) to request acceleration for the code portion. In some embodiments, a desired adjusted hardware acceleration is specified. For example, adjusted hardware acceleration up to 75%, 85%, 95%, etc. of a chipset's maximum capability may be specified. Maximum capability may be specified in terms of clock frequency, energy consumption, and so forth. In some embodiments, the opportunity to utilize acceleration is received by an application as an application level request due to an action by a user (e.g., via a user input to start scrolling a newsfeed, message, message list, etc.).

At 206, a determination as to whether to allow the adjusted hardware acceleration is made based at least in part on a configuration received via a network. In some embodiments, acceleration of the portion of application code, no acceleration of the portion of application code, or partial acceleration of the portion of application code can result from the determination. For example, no acceleration would be permitted if conditions designed to safeguard device hardware are not met. There may also be scenarios in which acceleration of a limited duration would be acceptable. In various embodiments, safeguard conditions are stored on the device running the application (e.g., as configuration information in a configuration file). In some embodiments, the received configuration is received from an application server connected to the network and updated periodically on the device.

At 208, the portion of the application code is executed in accordance with the determination as to whether to allow the adjusted hardware acceleration. For example, the portion of the application code may be executed without acceleration if safeguard conditions are not met and may be executed, at least partially, with acceleration otherwise.

At 210, usage data associated with execution of the portion of the application code is collected. Examples of information associated with each instance of acceleration that may be collected include start time, end time, duration, code segments affected, acceleration parameters (e.g., clock frequency), whether acceleration was stopped (e.g., due to reaching a duration limit), etc. In some embodiments, usage data is aggregated (e.g., compiled into a daily report format) and sent for analysis (e.g., sent to an application server). Usage data may be stored locally (e.g., in storage associated with application instance 104 or 114 of FIG. 1) in order to determine whether acceleration duration limits have been exceeded (e.g., acceleration duration limits that are associated with safeguard conditions).

Figure 3:
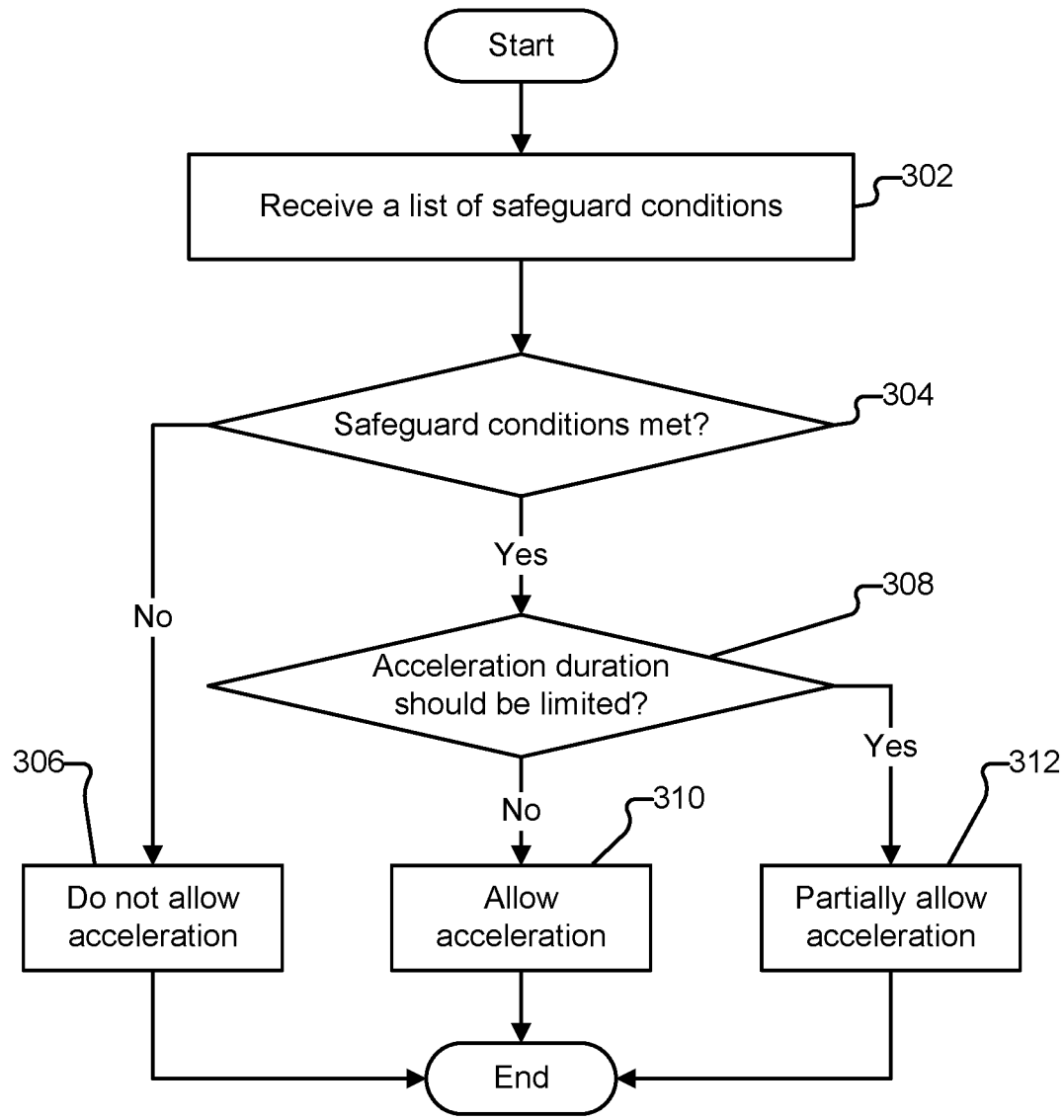
FIG. 3 is a flowchart illustrating an embodiment of a process for determining whether acceleration should be allowed.

FIG. 3 is a flowchart illustrating an embodiment of a process for determining whether acceleration should be allowed. In some embodiments, this process is performed by application instance 104 or application instance 114 of FIG. 1. In some embodiments, at least a portion of the process of FIG. 3 is performed in 206 of FIG. 2.

At 302, a list of safeguard conditions is received. Safeguard conditions may be included in configuration information received via a network. For example, an updated hardware configuration blacklist may be received by a device (e.g., device 102 or 112 of FIG. 1) via a network (e.g., network 120 of FIG. 1) upon the first launch of the day of an application (e.g., application instance 104 or 114 of FIG. 1). The hardware configurations may be specified in terms of device brand, device model, device OS, device chipset, device API, and/or combinations thereof. In some embodiments, acceleration is only allowed for hardware configurations that are not blacklisted. Other safeguard conditions may also be included in configuration information received via a network but may not need to be updated as frequently as hardware configuration blacklists. For example, duration limits associated with hardware acceleration (e.g., maximum continuous acceleration time, maximum acceleration time over a minute, maximum acceleration time over an hour, maximum acceleration time over a day, etc.) might not need to be updated often. These safeguards may also be hard-coded and thus not included in configuration information.

Examples of duration limits include a maximum continuous acceleration limit of 10 seconds (timeout after 10 seconds), maximum acceleration limit of a specified number of seconds over a minute, maximum time percentage acceleration over an hour, etc. In various embodiments, the maximum continuous acceleration limit (e.g., 10 seconds) is configured so that after a timeout occurs (e.g., after 10 seconds if 10 seconds is the limit), no acceleration is allowed until a new start marker is encountered in a portion of application code requested to be accelerated. In various embodiments, in order to ensure programmatic errors (e.g., a developer inadvertently omitting an end marker for the portion of application code to be accelerated) are mitigated, a built-in timeout mechanism (e.g., timeout after 10 seconds of continuous acceleration) is used to trigger end marker logic to notify a chipset that acceleration is no longer desired.

Duration limits may be configured to depend on the time of day (e.g., more or less acceleration allowed during the evening). Duration limits may also be configured to reset after a specified period of time (e.g., a day, 12 hours, 3 hours, etc.). Running averages (e.g., running average over 1 minute, 1 hour, 1 day, etc.) of duration limits may also be used. Other types of duration limits are also possible. In some embodiments, the only duration limit is a maximum continuous acceleration limit (e.g., when a maximum continuous acceleration limit is reached, no acceleration is allowed for the portion of code being accelerated).

Some safeguard conditions are typically hardcoded into the application whose application code may be accelerated. For example, requiring hardware specific (e.g., chipset) and OS specific safeguards be met before allowing acceleration is typically a safeguard condition that is hardcoded. For example, in various embodiments, no acceleration is allowed if the OS (or some other device system component) is specifically throttling the hardware. In addition, no acceleration would be allowed if the device hardware or OS is curbing hardware performance due to CPU temperature being too high, battery drain being excessive, etc. In various embodiments, another safeguard condition that must be met before application code is accelerated is that the application running the application code be in the foreground. Stated alternatively, in various embodiments, acceleration is not allowed if the application is running in the background. Allowing acceleration of an application while it is in the background might unacceptably alter performance of foreground applications.

At 304, it is determined whether the safeguard conditions have been met. If at 304 it is determined that the safeguard conditions have not been met, at 306, no acceleration is allowed. If at 304 it is determined that the safeguard conditions have been met, at 308, it is determined whether acceleration duration should be limited. In some embodiments, if it is determined that the safeguard conditions have been met, an identified chipset API (e.g., identified during initialization step 202 of FIG. 2) is called to initiate at least partial acceleration of a portion of application code.

If at 308 it is determined that acceleration duration should not be limited, at 310, acceleration is allowed. In various embodiments, if it is determined that acceleration duration should not be limited, then the complete portion of application code requested to be executed with an adjusted hardware acceleration is executed (e.g., acceleration begins when a starting code marker is reached and does not end until an ending code marker is reached). For example, if acceleration is requested in association with a scrolling task, acceleration may continue until the scrolling is completed.

If at 308 it is determined that acceleration duration should be limited, at 312, partial acceleration is allowed. For example, if there is an acceleration duration limit of a specified number of seconds of acceleration over any given minute and that duration limit has almost been reached, acceleration of a shortened duration may be allowed in the remainder of the current minute. Other duration limits (e.g., hourly, daily, etc.) may also require only allowing partial acceleration. In some embodiments, acceleration is limited is allowed in order to meet running average duration limits.

Figure 4:
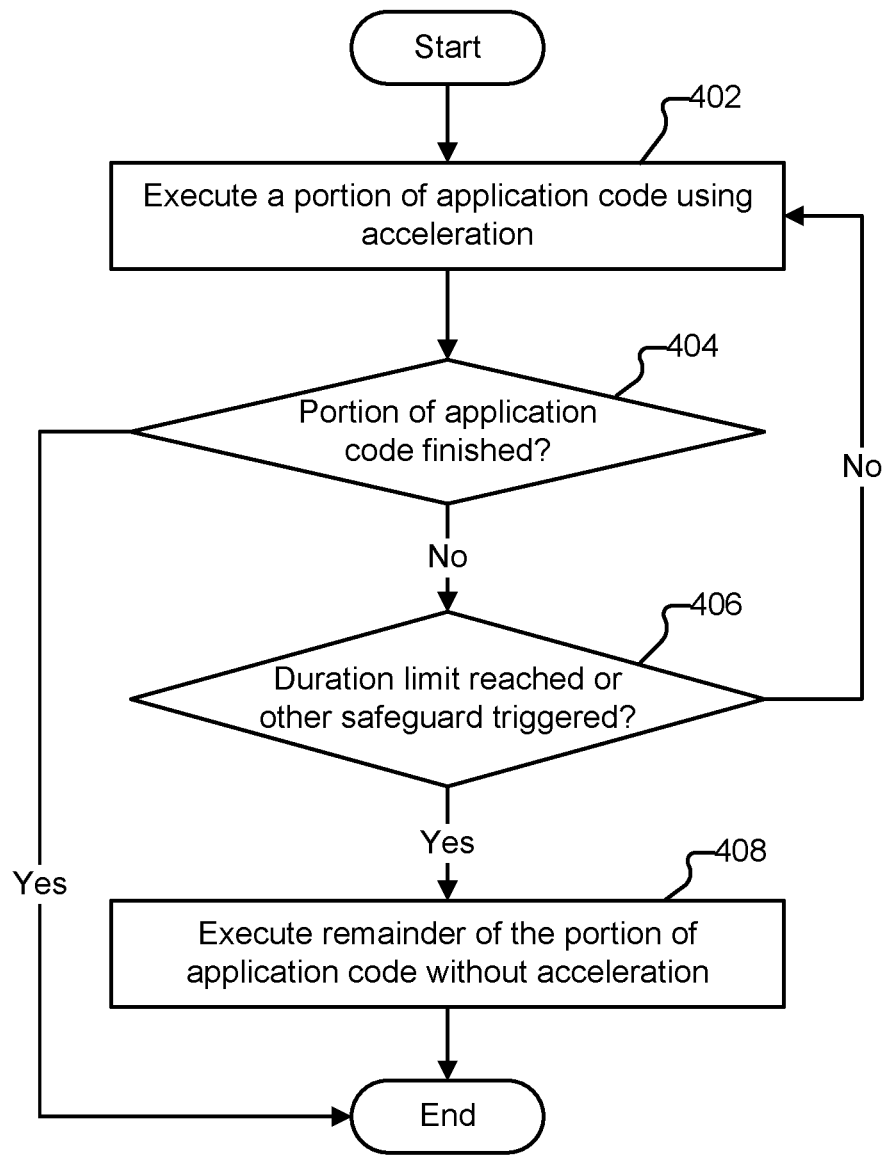
FIG. 4 is a flowchart illustrating an embodiment of a process for executing a portion of application code.

FIG. 4 is a flowchart illustrating an embodiment of a process for executing a portion of application code. In some embodiments, this process is performed by device 102 or device 112 of FIG. 1. In some embodiments, at least a portion of the process of FIG. 4 is performed in 208 of FIG. 2.

At 402, a portion of application code is executed using acceleration. Examples of application code portions that may benefit from acceleration and thus be executed using acceleration include application code portions associated with newsfeed scrolling, message scrolling, message list scrolling, user interface transitions, and other scenarios. In some embodiments, the portion of application code is executed (at least partially) using acceleration after it is determined that specified safeguard conditions have been met (e.g., cleared a hardware configuration blacklist).

At 404, it is determined whether the portion of application code has finished. If at 404 it is determined that the portion of application code has finished, then no further action is taken. If at 404 it is determined that the portion of application code has not finished, at 406, it is determined whether a duration limit has been reached or some other safeguard has been triggered. If at 406 it is determined that no duration limit has been reached or some other safeguard has been triggered, at 402, execution of the portion of application code using acceleration is continued. Examples of duration limits include maximum continuous acceleration limits, acceleration limit over various durations (e.g., a minute, an hour, a day, etc.), running average duration limits, duration limits that depend on the time of day and/or other factors, etc. Examples of other safeguards include runtime safeguards (e.g., the application running the portion of application code switches to the background, device throttling is triggered due to high CPU temperature, excessive battery drain, or some other reason, etc.).

If at 406 it is determined that a duration limit has been reached or some other safeguard has been triggered, at 408, the remainder of the portion of application code is executed without acceleration. In some embodiments, if the remainder of the portion of application code is particularly long such that a significant amount of time will have passed after discontinuing acceleration, it may be possible to reengage acceleration after the significant amount of time has passed.

Figure 5:
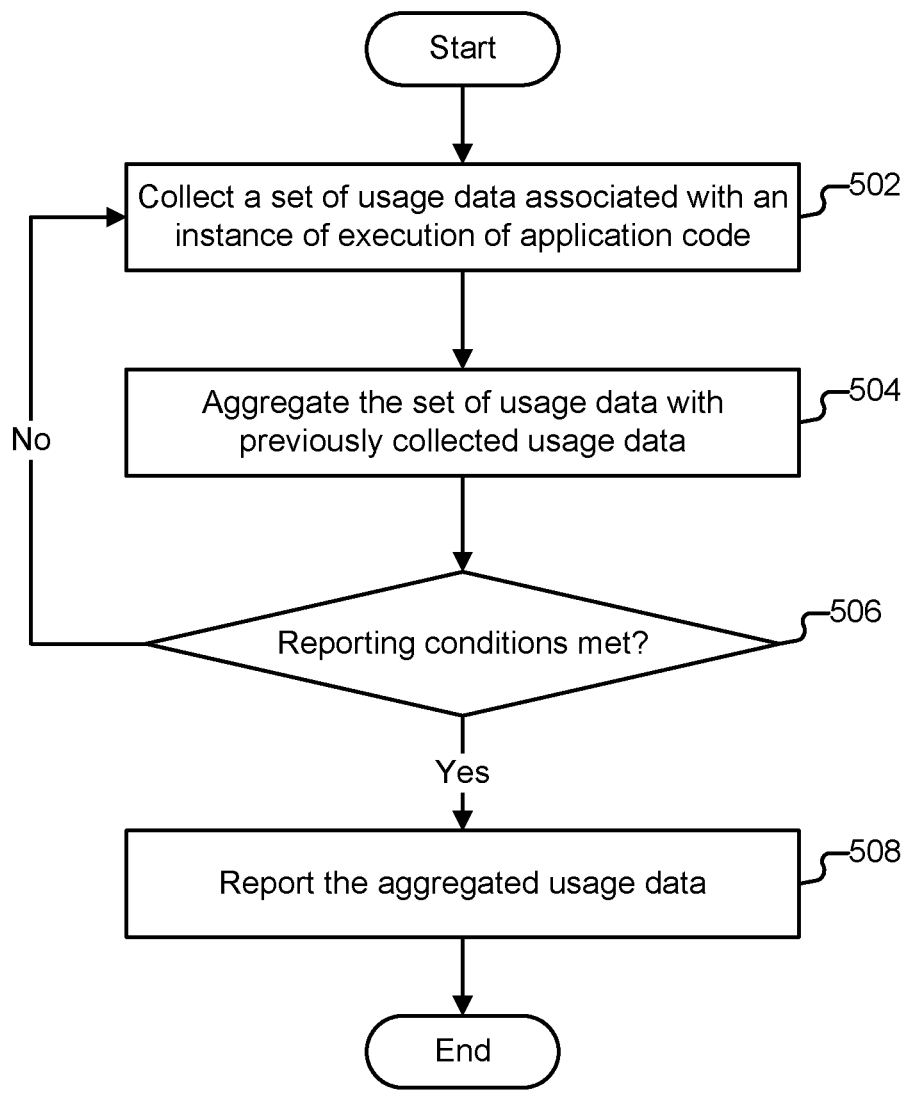
FIG. 5 is a flowchart illustrating an embodiment of a process for collecting and reporting usage data.

FIG. 5 is a flowchart illustrating an embodiment of a process for collecting and reporting usage data. In some embodiments, this process is performed by application instance 104 or application instance 114 of FIG. 1. In some embodiments, at least a portion of the process of FIG. 5 is performed in 210 of FIG. 2.

At 502, a set of usage data associated with an instance of execution of application code is collected. Examples of usage data associated with the instance of execution that may be collected include start time, end time, duration, code segment accelerated, CPU frequency, other acceleration parameters, acceleration timeout or interruption status (e.g., interrupted due to high CPU temperature, excessive battery drain, or other reasons), etc. Other information may be collected when an application is first launched after it is installed (e.g., device brand, device model, and other hardware settings that do not change) or may be collected periodically (e.g., OS version and other software settings that do not change frequently). In some embodiments, whether an adjusted hardware acceleration was allowed, not allowed, or partially allowed is logged.

At 504, the set of usage data is aggregated with previously collected usage data. For example, durations of instances of acceleration may be summed to determine total duration of acceleration in the past minute, 15 minutes, 30 minutes, hour, 3 hours, 12 hours, 24 hours, and so forth. This information may be used to determine whether hardware acceleration on a device has exceeded various quotas (e.g., maximum acceleration in the past minute, 15 minutes, 30 minutes, hour, 3 hours, 12 hours, 24 hours, and so forth). The information may be used to determine whether hardware acceleration on the device has exceeded running average quotas as well. In some embodiments, usage data is used to update configuration information. For example, if certain hardware configurations are associated with frequent acceleration interruption due to high CPU temperature or excessive battery drain, future hardware configuration blacklists may be updated to include these hardware configurations.

Blacklists may be automatically updated based on collected usage data detailing impact of acceleration on device performance, duration of acceleration per device, frequency of acceleration timeouts and/or interruptions, frequency of acceleration quotas being met, etc. Collected usage data may be used to blacklist specific hardware configurations and/or specific scenarios that depend on factors in addition to hardware configuration (e.g., how much acceleration has already occurred during a specified time period, time during the day when acceleration is requested, etc.).

In some embodiments, collected usage data is used to modify future instances of acceleration. For example, CPU frequency or power consumption may be tailored to reduce occurrence of acceleration timeouts (e.g., due to acceleration duration limits and/or quotas being met) and/or interruptions (e.g., due to high CPU temperature, excessive battery drain, or other device performance causes). Collected usage information may be used to determine how to utilize different cores in a multi-core processor. Stated alternatively, correlation of acceleration parameters with impact of acceleration on device performance may be analyzed to modify acceleration parameters. For example, if a specified activity (e.g., newsfeed scrolling under certain circumstances) is associated with frequent acceleration interruption, then future instances of the specified activity could be accelerated using lower CPU frequency or power.

At 506, it is determined whether reporting conditions have been met. If at 506 it is determined that reporting conditions have not been met, at 502, collection of usage data continues. An example reporting condition is that the end of the day has been reached or some other specific time of day has been reached (indicating aggregation of daily data is complete). Another example reporting condition is that a specified amount of usage data has been collected.

If at 506 it is determined that reporting conditions have been met, at 508, the aggregated usage data is reported. In some embodiments, the aggregated data is reported to an application server (e.g., application server 122 of FIG. 1) using a network (e.g., network 120 of FIG. 1). The application server may analyze the reported data in order to update configuration information. The updated configuration information may then be distributed to devices from which usage data has been collected.

Figure 6:
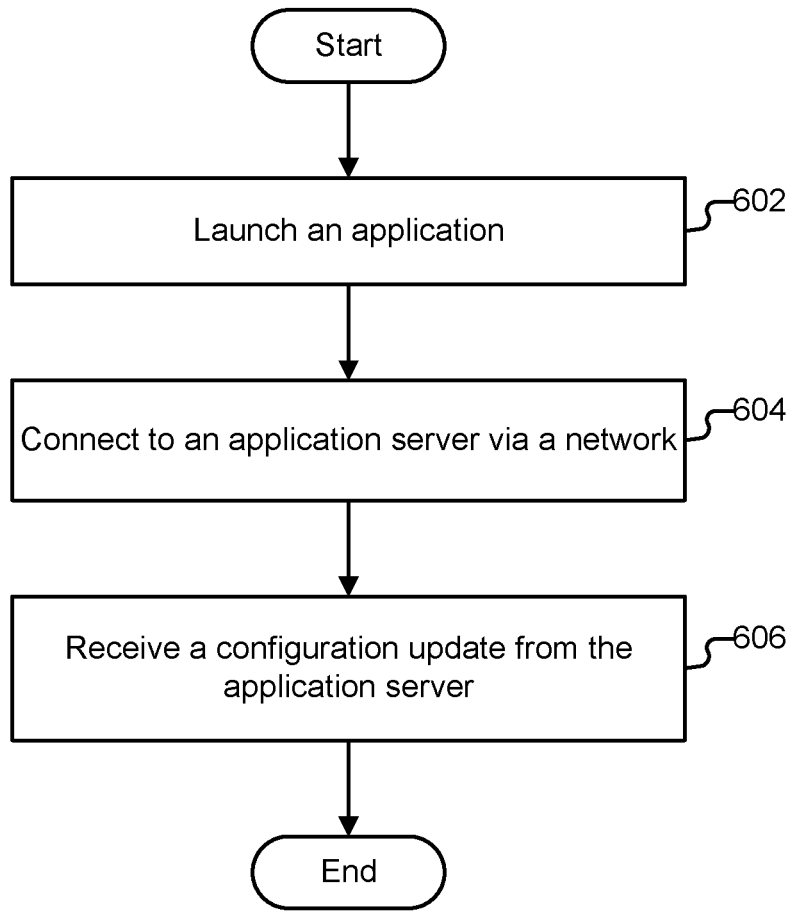
FIG. 6 is a flowchart illustrating an embodiment of a process for receiving configuration information.

FIG. 6 is a flowchart illustrating an embodiment of a process for receiving configuration information. In some embodiments, this process is performed by device 102 or device 112 of FIG. 1. In some embodiments, at least a portion of the process of FIG. 6 is performed in 202 of FIG. 2.

At 602, an application is launched. For example, the application may be a social media application that allows users to scroll through newsfeeds, messages, images, etc. or it may be any other type of application. In some embodiments, the application runs on a mobile device (e.g., a smartphone).

At 604, an application server is connected to via a network. For example, application server 122 of FIG. 1 may be connected to via network 120 of FIG. 1. In some embodiments, the application server stores configuration information (e.g., hardware configuration blacklists). The application server may also store new versions of the application (e.g., updated versions of the application that include modified application code relating to hardware acceleration). For example, new versions of the application may support additional chipset APIs (and thus acceleration for different chipsets).

At 606, a configuration update is received from the application server. In some embodiments, the configuration update is received when the application receiving the configuration update is launched each day or launched at a specified time (e.g., a specified time each week). The configuration update may also be received when the application is idle. In some embodiments, modified application code is received when the application receives a larger update (e.g., a new version of the application, a patch, etc.). For example, modified application code may be introduced in a version update or patch in order to support interfacing with previously unsupported chipset APIs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving from an application instance executing on a hardware processor on a device, an application level request associated with a portion of an application code of the application instance requested to be executed on the same hardware processor with an adjusted hardware acceleration, wherein the portion of the application code is identified using a mechanism compatible with a plurality of different types of hardware processors, wherein the portion of application code is identified by software markers that designate the portion of the application code;
  determining whether to allow the adjusted hardware acceleration of the portion of the application code on the hardware processor based at least in part on a configuration received by the device via a network, safeguard conditions being included in the configuration, wherein determining whether to allow the adjusted hardware acceleration includes determining whether to partially allow the adjusted hardware acceleration of the portion of the application code and determining whether an acceleration duration for the portion of the application code should be limited; and
  in response to a determination to partially allow the adjusted hardware acceleration of the portion of the application code and a determination that the acceleration duration should be limited, performing partial acceleration of the portion of the application code on the same hardware processor capable of executing without or with the adjusted hardware acceleration the portion of the application code identified by the application level request for the adjusted hardware acceleration and, based on the determination to limit the acceleration duration, disallowing the adjusted hardware acceleration prior to a completion of the identified portion of the application code.

2. The method of claim 1, wherein determining whether to allow the adjusted hardware acceleration includes determining whether a duration limit associated with the adjusted hardware acceleration has been exceeded.

3. The method of claim 2, wherein the duration limit is a limit on a continuous duration of acceleration.

4. The method of claim 2, wherein the duration limit is based on a total time of acceleration over a specified period.

5. The method of claim 1, further comprising, in response to the determination to partially allow the adjusted hardware acceleration, translating the request to a hardware platform specific instruction to adjust hardware acceleration and issuing the hardware platform specific instruction.

6. The method of claim 1, further comprising, in response to the determination to partially allow the adjusted hardware acceleration, transmitting the request via an application programming interface to a chipset for implementation of the request.

7. The method of claim 1, wherein determining whether to allow the adjusted hardware acceleration includes determining a foreground and/or background status associated with the application instance running the identified portion of the application code.

8. The method of claim 1, wherein the configuration includes a list of hardware configurations that are not eligible for the adjusted hardware acceleration.

9. The method of claim 1, wherein the identified portion of the application code is associated with a scrolling feature of an application.

10. The method of claim 1, wherein the determination of whether to allow the adjusted hardware acceleration is based at least in part on a temperature status of one or more hardware components and/or a battery status.

11. The method of claim 1, further comprising interrupting an instance of allowed adjusted hardware acceleration of the identified portion of the application code based at least in part on a temperature status of one or more hardware components and/or a battery drain status.

12. The method of claim 1, wherein the adjusted hardware acceleration corresponds to an increased processor clock frequency.

13. The method of claim 1, further comprising collecting usage data associated with executing the portion of the application code when the adjusted hardware acceleration is at least partially allowed.

14. The method of claim 13, further comprising reporting the collected usage data to an application server via the network.

15. The method of claim 1, wherein the portion of the application code is configured to execute on a mobile device.

16. A system, comprising:
a processor configured to:
receive from an application instance executing on a hardware processor on a device, an application level request associated with a portion of an application code of the application instance requested to be executed on the same hardware processor with an adjusted hardware acceleration, wherein the portion of the application code is identified using a mechanism compatible with a plurality of different types of hardware processors, wherein the portion of application code is identified by software markers that designate the portion of the application code;

determine whether to allow the adjusted hardware acceleration of the portion of the application code on the hardware processor based at least in part on a configuration received by the device via a network, safeguard conditions being included in the configuration received via the network, wherein being configured to determine whether to allow the adjusted hardware acceleration includes being configured to determine whether to partially allow the adjusted hardware acceleration of the portion of the application code and determine whether an acceleration duration for the portion of the application code should be limited; and in response to a determination to partially allow the adjusted hardware acceleration of the portion of the application code and a determination that the acceleration duration should be limited, perform partial acceleration of the portion of the application code on the same hardware processor capable of executing without or with the adjusted hardware acceleration the portion of the application code identified by the application level request for the adjusted hardware acceleration and, based on the determination to limit the acceleration duration, disallow the adjusted hardware acceleration prior to a completion of the identified portion of the application code; and a memory coupled to the processor and configured to provide the processor with instructions.

17. The system of claim 16, wherein the configuration includes a list of hardware configurations that are not eligible for the adjusted hardware acceleration.

18. The system of claim 16, wherein the processor is further configured to collect usage data associated with executing the portion of the application code when the adjusted hardware acceleration is at least partially allowed.

19. The system of claim 16, wherein the portion of the application code is configured to execute on a mobile device.

20. A computer program product, the computer program product being embodied in a non-transitory computer readable storage medium and comprising computer instructions for:

receiving from an application instance executing on a hardware processor on a device, an application level request associated with a portion of an application code of the application instance requested to be executed on the same hardware processor with an adjusted hardware acceleration, wherein the portion of the application code is identified using a mechanism compatible with a plurality of different types of hardware processors, wherein the portion of application code is identified by software markers that designate the portion of the application code;

determining whether to allow the adjusted hardware acceleration of the portion of the application code on the hardware processor based at least in part on a configuration received by the device via a network, safeguard conditions being included in the configuration, wherein determining whether to allow the adjusted hardware acceleration includes determining whether to partially allow the adjusted hardware acceleration of the portion of the application code and determining whether an acceleration duration for the portion of the application code should be limited; and in response to a determination to partially allow the adjusted hardware acceleration of the portion of the application code and a determination that the acceleration duration should be limited, performing partial acceleration of the portion of the application code on the same hardware processor capable of executing without or with the adjusted hardware acceleration the portion of the application code identified by the application level request for the adjusted hardware acceleration and, based on the determination to limit the acceleration duration, disallowing the adjusted hardware acceleration prior to a completion of the identified portion of the application code.

\* \* \* \* \*